July 18, 1939.  C. E. STAUDT  2,166,572

ARTICULATED DISPLAY DEVICE

Filed Jan. 27, 1938  4 Sheets-Sheet 1

INVENTOR.
CARL E. STAUDT.
BY
ATTORNEYS.

July 18, 1939.　　　　C. E. STAUDT　　　　2,166,572
ARTICULATED DISPLAY DEVICE
Filed Jan. 27, 1938　　　4 Sheets-Sheet 2
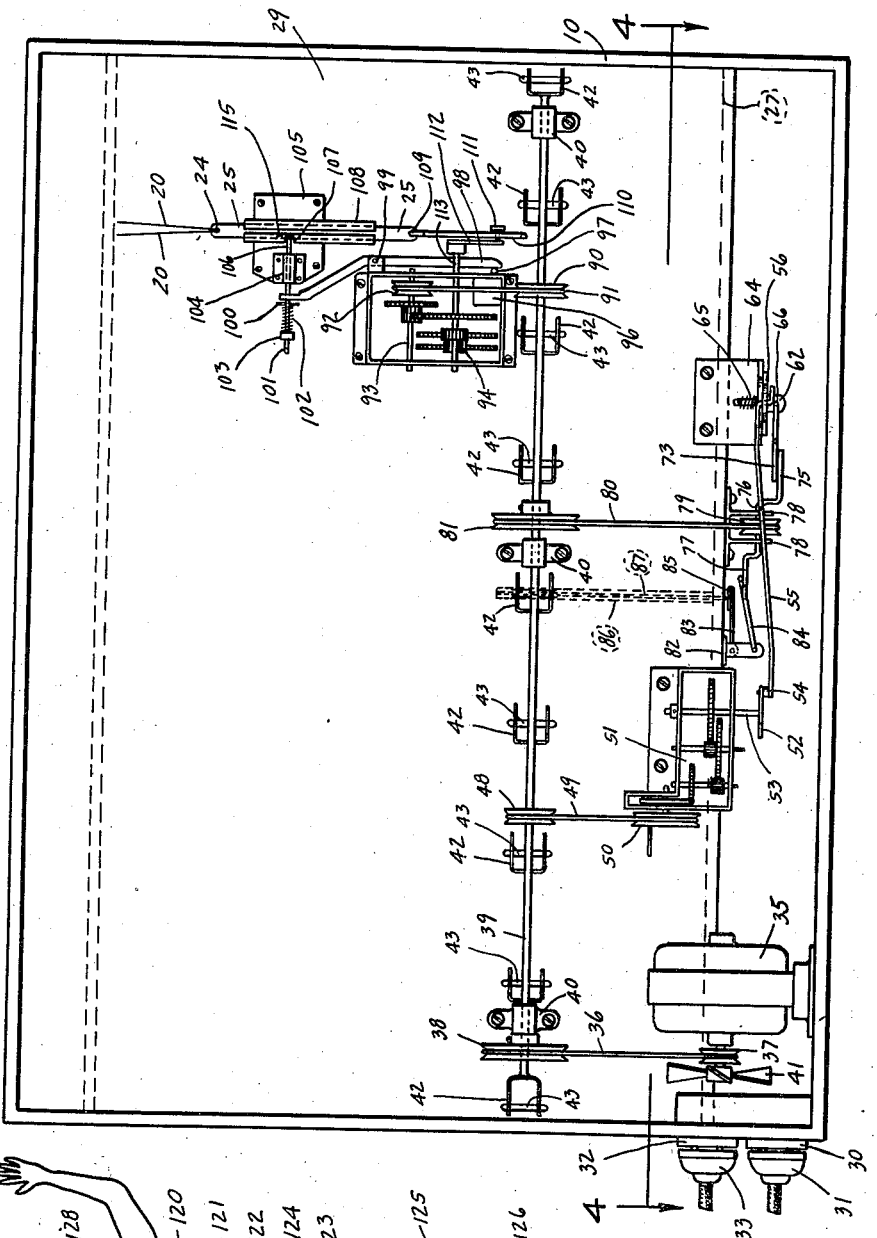
FIG. 3
FIG. 6
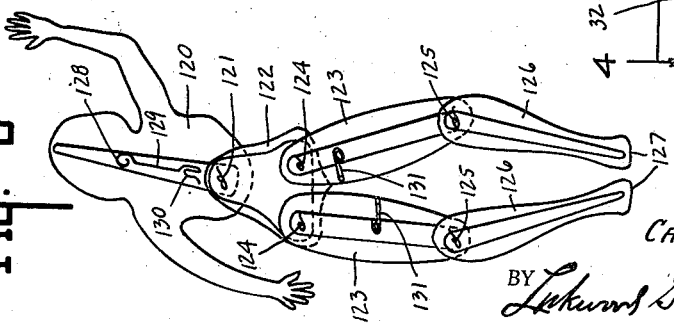
INVENTOR.
CARL E. STAUDT.
BY
ATTORNEYS.

July 18, 1939.　　　C. E. STAUDT　　　2,166,572
ARTICULATED DISPLAY DEVICE
Filed Jan. 27, 1938　　　4 Sheets-Sheet 3
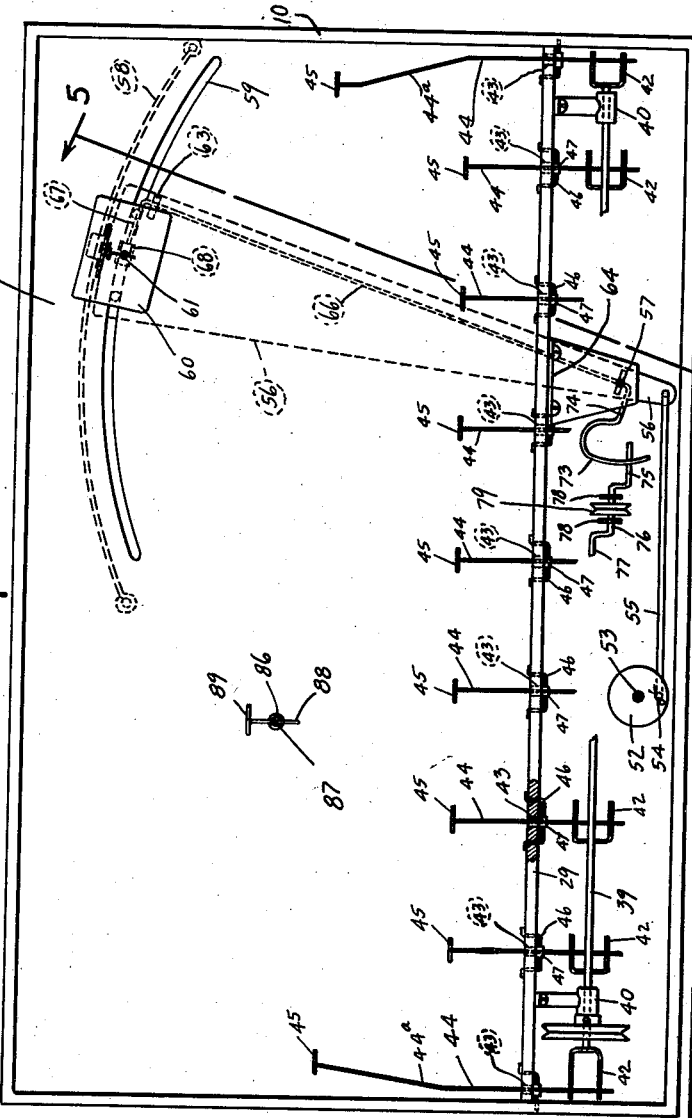
INVENTOR.
CARL E. STAUDT.
BY
ATTORNEYS July 18, 1939.          C. E. STAUDT          2,166,572
ARTICULATED DISPLAY DEVICE
Filed Jan. 27, 1938          4 Sheets-Sheet 4
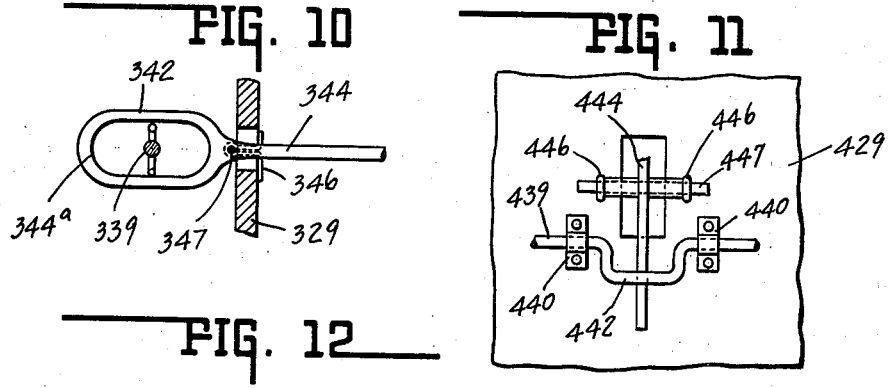
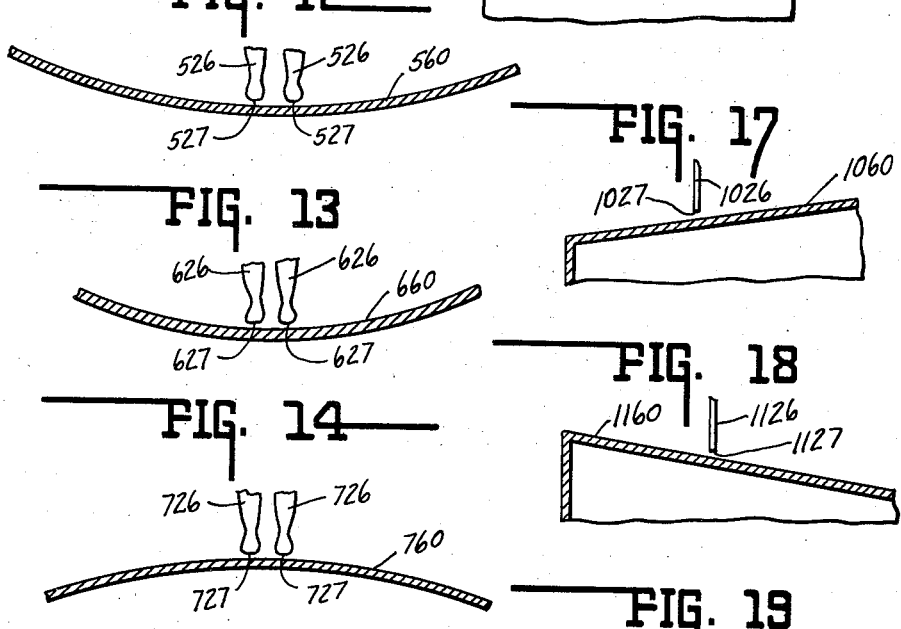
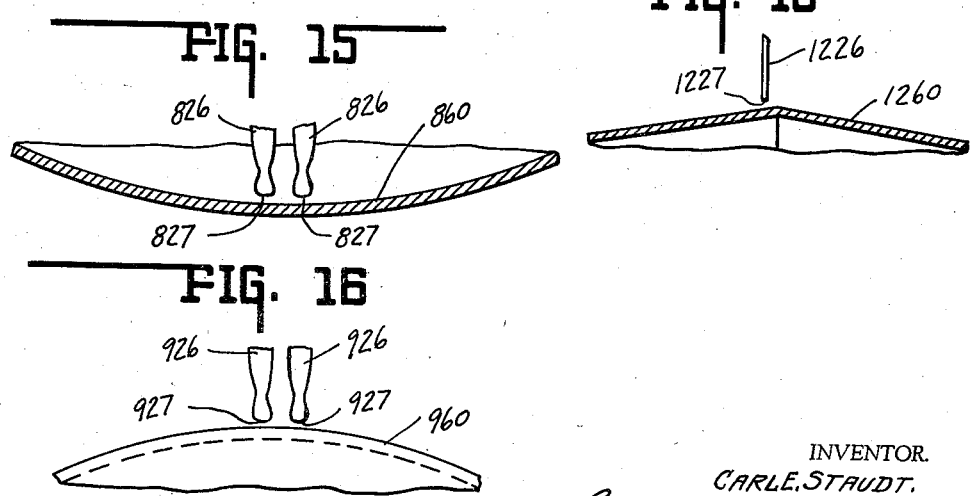
INVENTOR.
CARL E. STAUDT.
BY
ATTORNEYS.

Patented July 18, 1939

2,166,572

UNITED STATES PATENT OFFICE 2,166,572

ARTICULATED DISPLAY DEVICE

Carl E. Staudt, Indianapolis, Ind., assignor, by mesne assignments, to said Carl E. Staudt and Anna R. Staudt, joint owners with the right of survivorship Application January 27, 1938, Serial No. 187,122

8 Claims. (Cl. 46—138)

This invention relates to a display device of the toy stage character, although certain broad phases thereof are not limited to such application.

The chief object of the invention is to provide an articulated representation of an animated object such as man, or the like, and by reciprocation secure life-like movement of the representation.

Herein the human body has been selected as the animated object represented by the articulated representation. However, such selection is merely by way of illustration and not of restriction, because other objects represented have been from the animal kingdom other than man.

Another object of the invention is to provide a display device of one or more articulated representations and actuate the same in simulation of a stage performance.

The several features of the invention consist in the means embodying the invention, whereby the aforesaid objects are accomplished as well as such features as will appear more fully hereinafter.

The full nature of the invention will be understood from the accompanying drawings and the following description and claims.

In the drawings,

Fig. 3 is a rear elevational view of the several power mechanisms embodied in the stage embodiment of the invention.

Fig. 4 is a transverse sectional view of the articulated representations moving mechanisms, and is taken on line 4—4 of Fig. 3 and in the direction of the arrows.

Fig. 5 is a vertical sectional view taken on line 5—5 of Fig. 4 and in the direction of the arrows.

Fig. 6 is an enlarged rear elevational view of one of the animated chorus figures shown in Fig. 1.

Fig. 7 is a similar view of the animated main figure shown in Fig. 1.

Fig. 8 is a similar but front view of a modified head portion of an animated figure.

Fig. 10 is a view similar to Fig. 9 and of a modified form of rotary to and reciprocatory transformation.

Fig. 11 is an elevational view of a further modified form of such a transformation device and is taken at right angles to the views illustrated in Figs. 9 and 10.

Fig. 12 is a sectional view of a modified form of foot engaging surface and of concave curvilinear type, the radius of curvature being of considerable amount.

Fig. 13 is a similar view of similar surface, the radius of curvature being of lesser amount.

Fig. 14 is a similar view of a convex curvilinear surface.

Fig. 15 is a similar view of a saucer or bowl type surface.

Fig. 16 is a similar view of a spherical type surface.

Fig. 17 is a similar view of an inclined surface, the inclination being directed downwardly toward the spectator.

Fig. 18 is a view of a similar surface oppositely directed.

Fig. 19 is an elevational view of a portion of pyramidal surface.

Figure 1:
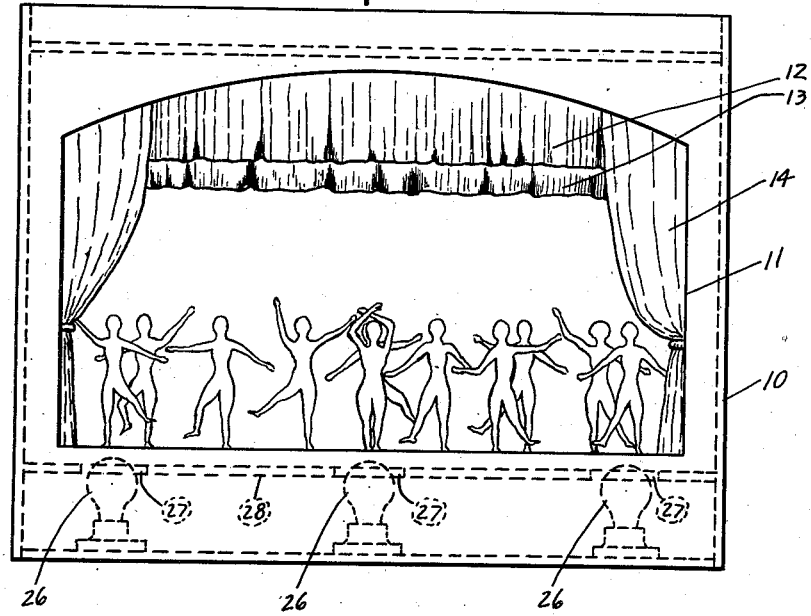
Fig. 1 is a front view of a display device embodying the stage representation of the invention.

In the drawings, 10 indicates generally a cabinet having an opening 11 therein which exposes a pair of ceiling drops 12 and 13 and side curtains 14. The stage type opening 11 is closed by a curtain mechanism.

An outlet 32 may be connected by a plug 33 to a source of energy and the same supplies energy to a motor 35 which through a belt or cord 36 and the pulleys 37 and 38, respectively, serve to supply rotational power at a slower speed to shaft 39 mounted in bearings 40—see Figs. 3 and 4—carried by the back wall 29, this shaft being in the rear compartment of the cabinet. A fan 41 may be utilized to cool the motor when such is necessary and serves as a power drag or load.

Figure 9:
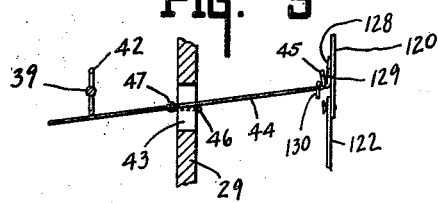
Fig. 9 is a side elevational view of a portion of the power mechanism for one of the animated chorus figures.

Mounted on the shaft 39 in predetermined spaced relation are a plurality of U-shaped members 42 which serve as chorus mechanism actuating members. As shown clearly in Figs. 4 and 9, the shaft 39 is spaced a considerable distance from the back wall 29.

The back wall 29 is apertured as at 43 and projecting through said aperture is a wire member 44 which has a T-type end 45. The U-shaped member 46—see Fig. 4—is suitably secured to the wall 29 adjacent the aperture and serves as a pivotal support as at 47 for the member 44, the free end of which lies beneath the shaft 39 and is engaged in the timed revolution of the shaft by the arms of the members 42—see Fig. 9. Thus, member 44 is caused to tilt twice in each revolution of shaft 39 and this causes vertical reciprocation of the T-type end 45, which includes a return bend arrangement. To this end 45 is attached a chorus mechanism figure shown more especially in Fig. 6 and to which reference will be had hereinafter. The forms shown in Figs. 7 or 8 may be used as well.

It will be noted—see Fig. 4—the two end members 44 are considerably elongated and include an offset or inclined portion 44a so that the end members in the chorus are positioned at the end of the chorus line near the sides of the stage and forwardly of the rearward figures of the chorus. Herein, the distance apart of the arms of the two corresponding U-shaped members 42 is proportionately reduced so that the movement of the end chorus figures will be substantially equal to the others.

For clearness, only one of the main characters is illustrated and one of the operating mechanisms therefor, it being understood a second main character may be incorporated. Also, a minor principal character is herein illustrated as positioned rearwardly of the main character but ahead of the chorus.

The mechanism for actuating the major and minor characters will now be described. The difference between the two is that the minor character, while it has animation or simulates movement of the human form only, it does not have movement from one position on the stage to another, which the major principal representation has such stage movement.

Mounted on shaft 39 is a pulley 48—see Fig. 3—which through cord 49 or equivalent device, drives pulley 50 and through a gear train structure, indicated generally by numeral 51, and shown in Fig. 3, rotates the disc 52 mounted on shaft 53. The disc 52 carries a crank pin 54 connected to a connecting rod 55 which in turn is connected to an arm 56 pivoted at 57—see Fig. 5—and having its outer free end bearing on a wire support 58 suitably carried by the underface of the stage floor 27.

The stage floor—see Fig. 4—has an arcuate slot 59 concentric with the pivot 57 and a plate 60 carried by a tube 61 is in turn carried by the arm 56 so that the plate 60 has an arcuate path and also serves as a platform. Tube 61 rides in slot 59—see Fig. 5.

Depending from the member 56 is a pair of guide members 62 and 63, the former being associated with the pivot 57, said pivot being operatively associated with and supported by the plate 64 carried by the back wall 29 and providing a yielding support through the spring 65—see Fig. 5—for the pivot and guide structure.

Mounted in the pivot guide 62 and guide structure 63, is a wire 66 which has an angular end 67 that terminates in a plate 68 which underlies the lower open end of tube 61. The lower end of rod 69 exposed thereby bears on this plate 68 and extends upwardly in the tube 61, the latter being slotted at opposite sides as at 70—see Fig. 5. The T-shaped end 71 of the rod 69 is slidable in said slots 70 and reciprocates toward and away from the floor 27 as member 66 is rocked, as hereinafter set forth. The T-shaped end of the member 71 terminates in a hook 72—see Fig. 5—to which is attached the anchorage of the main character figure, such as shown in Figs. 7 or 8, for securing animated movement thereof. It will be apparent that as the disc 52 rotates, the main or principal figure is caused to move to and fro across the stage from one side thereof toward the center, and vice versa, and also will have "up and down" movement.

Reference will now be had to the power arrangement for rocking member 67 to secure body animation of the principal character. This mechanism is shown most clearly in Figs. 3, 4 and 5. The rod 66 adjacent the pivot (57) for the arm 56 has an arcuate extension 73, said arcuate portion being a continuation of the angular portion 74. This arcuate portion 73 is positioned above an offset portion 75 on a shaft 76 which has an opposite offset portion 77. Shaft 76 is rotatably mounted in bearings 78 carried by floor 27. Between the bearings and mounted on said shaft 76 is the pulley 79 operated by a cord or cable 80, driven by pulley 81, carried by shaft 39—see Fig. 3. Each rotation of pulley 79 causes the offset arm 75 to engage the curved portion 73 of the rocking member 66 to cause raising and lowering of the transverse portion 71—72 to provide vertical power for reciprocation to secure animated movement of the principal figure.

Pivotally supported at 82 upon the lower face of floor 27—see Fig. 3—is a bellcrank 83 and the same includes an arm 84 also curved similar to the curved arm 73 but reversely positioned. The other arm of the bellcrank 83 has a plate 85 thereon and the same registers with an opening in the floor 27 from which projects a slotted tube 86—see Figs. 3 and 4—and in which is mounted a rod 87. The rod 87 has an end structure 88—89 similar to the end structure 71—72— shown in Fig. 5—for the main, major figure. The minor figure is associated with this arm. The various figures, therefore, are caused to move in timed relation, the two principal figures moving in the same timed relation, all of the chorus figures moving in the same timed relation and the timed relation therebetween being that determinable by the ratio of the rate of rotation of shaft 39 and the wheel 79, it being remembered that shaft 39 in one rotation causes two reciprocations of the chorus figure power mechanisms, whereas one rotation of wheel 79 causes but one reciprocation of the main and minor character reciprocating mechanisms.

Figure 2:
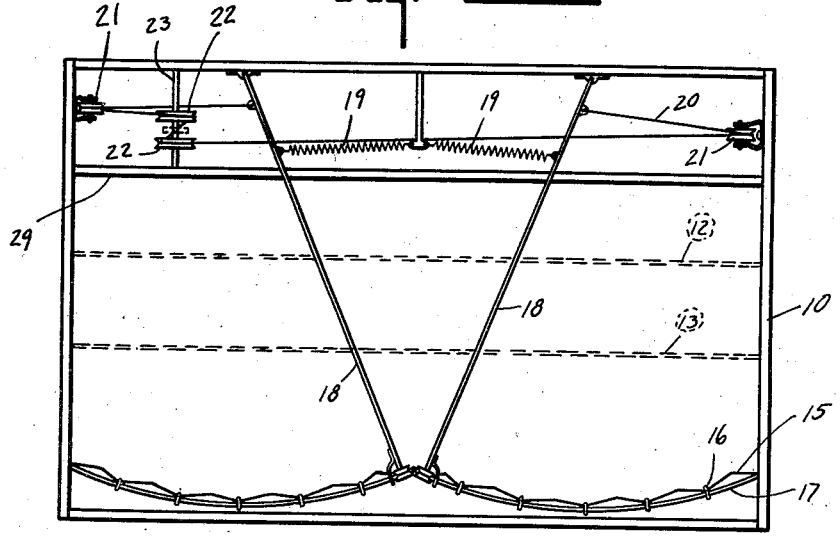
Fig. 2 is a transverse sectional view of the curtain actuating mechanism.

By referring to Figs. 2 and 3, it will be noted that when the lever 98 is tilted by member 97 to withdraw the pin end 106 in the slot 107 of the guide 108 and from the notch 115 in bar 25 and when the crank arm 112 moves toward its lowest position, the crank arm pulls downwardly on the bar 25 and thus downwardly on the cables 20 and serves to open the curtain by swinging the curtain arms 18 in opposition to springs 19. The curtain mechanism is then locked in the open curtain position by the rod 101 seating in said recess 115 when the bar is thus lowered. Furthermore, continued rotation of the shaft 113 is ineffective to raise the bar 25 because of the slot in member 110.

At the predetermined time interval for which mechanism 96 is arranged to operate, the lever 98 is tilted counterclockwise by member 97 which withdraws the end 106 of the rod 101 from the notch 115 in bar 25, and since there is an elongated slot and pin connection between the crank structure 111—112 and the bar 25, the springs 19—see Fig. 2—immediately become effective and elevate the rod 25 into closed curtain position and at the same time pull upwardly on the cables 20 and inwardly on the members 18 to close the curtain.

The foregoing constitutes a stage display mechanism or arrangement. Reference will now be had to Figures 6, 7 and 8, wherein three forms of articulated representations of an animated object, such as a human form or the like, is illustrated and which through vertical reciprocation of the portions 45, 71—72 and/or 88—89 secure the representation of human body movement. The form of the invention shown in Fig. 8 may be included in the forms of the invention shown in either Figs. 6 or 7 or both, if desired.

In Fig. 6 the simplest form of the animated invention is illustrated and the same includes by way of illustration an upper torso portion 120. Pivotally supporting below its center of gravity and in line therewith as at 121, is a lower torso portion 122. Two thigh representations 123, each, are pivotally supported at 124 near the lower portion of the lower torso portion and the pivots 124 are in alignment and equidistant from the line including pivot 121 and the center of gravity of said lower torso portion 122. The pivot 124 of the thigh portion is in a vertical line through the center of gravity of the thigh portion. Pivot 125 at the lower end of each thigh portion is also in this vertical line and by pivot 125 there is secured to each thigh portion a lower limb portion 126, the pivot 125 thereof being in the vertical line through the center of gravity of the portion 126. The lower limb portion terminates in the contact portion 127 which is in the vertical line including the center of gravity of the limb portion 126 and pivot 125. When the figure is fully extended, the several limb portions, upper and lower, are in the respective alignments are described.

Suitably secured to the upper torso portion as at 128 is an anchoring member 129 which has a hook portion 130, or the like, and said hook portion 130, or the like, is adapted to be associated with one of the forwardly projecting portions of the reciprocating portions of the reciprocating T-shaped members 44, before set forth. The amount of movement is such that when the reciprocating member is in its elevated position, the several limbs, and the like, are fully extended and clear the floor. Upon downward movement of the reciprocating member, the lower limbs at 127 engage the floor 27 and this engagement results in movement of the respective limbs, relative to each other, and the torso portions with respect to said limbs and each other thereby simulating actual movement of the human body.

To prevent locking or interference between the limb portions, each of the upper limb members 123 is shown provided with, near its adjacent edge, a guard member 131 to prevent the two upper limbs from overlapping. Any other equivalent guard means may be employed.

The several chorus figure representations although exactly identical as to articulation and though having the same timed relation for movement and having the same amount of vertical movement imparted to them, it has been found usually do not have the same sequence or representation of human movement although they may so operate.

In Fig. 7 a modified form of the invention is illustrated, wherein numerals of the two hundred series indicate parts similar or identical to parts shown in Fig. 6, the bearing numerals of the one hundred series. In this form of the invention, however, in place of the contact portions 127, anchorages 227 are provided which are connected together as at 232 and the same in turn is connected as at 233 to the plate 60, before mentioned with reference to the description of the principal figure, although such anchorage may also be secured to the floor 27 for the other representations.

The connection of members 227 to the lower ends of the lower limbs 226 are in the vertical lines including pivots 225 and the centers of gravity of said limb, and the connection 232—233 is in alignment with the centers of gravity of torso portions 220 and 222 and pivot 221 when the vertical line including the figure is extended.

Either of these forms of the invention may include therein the form of the invention shown in Fig. 8 wherein 320 indicates the upper torso portion having a face and head representation 338 with eye holes 337 therein. Back of same is a member 334 pivoted as at 340 to the head portion and having a weight 335 in alignment with the center of gravity of said member 334 and below the same. Member 334 has the pupil portions 336 normally exposed through eye holes 337.

In the tilting movement of member 320, when reciprocated, the eye representations move to and fro due to the weight 335 and inertia of member 334 to movement, thus simulating the rolling of eyes with the dancing or animation of the figure.

By experimentation extending over a period greater than a year with minature human representations, a full size human representation, and various forms of power mechanisms to ascertain the critical factors involved in commercial and mass production, it has been determined that the relation of the rate of reciprocation to the mass of the representation determines to a considerable degree the type of dance performed by said representations. Also, it has been determined that where smoothness of or long rhythmic sweeplike movement as distinguished from short and jerky movement is desired if the portions of the representation are quite rigid and the pivotal connections have little or no play, the actuating member to which the representation is connected, such as 44, 71 and 88, preferably are somewhat resilient. Also, it has been determined that different spacings of the lower limbs produce different variations of the same dance. Also, if the surface engaged by the toe portions is concave, the surface reduces or eliminates a considerable portion of the free swinging movement, while a convex surface accelerates or increases such swinging movement. The rounded portions at the knees creates the illusion of greater naturalness of the representation. It is preferred that the pivotal connection between representation portions also be of concealed character which further heightens the aforesaid illusion.

The weight of the several limb portions and lower torso portion preferably should be sufficient to overcome friction between pivotal connections so when not actuated all hang as illustrated in Fig. 7 and no matter what character the upper torso portion may depict, the head will be held erect.

Also, see Fig. 7, if the feet are secured closer together, the knees have a greater tendency to move outwardly from each other, while if secured wider apart, the tendency is for the knees to move inwardly toward each other. When the feet are spaced as shown, there is no predetermined tendency of movement but the latter is variable either in or out and for each leg, so the general dance movement is unpredictable.

Raising or lowering the pivotal connection between torso portions and raising and lowering the point of support of the representation relative to its center of gravity, each have predetermined effective tendencies. Likewise, the variation in thigh and calf portions and the raising and lowering of the upper leg connections relative to torso pivotal connection, as well as varying the spacing therebetween, each have predetermined effective tendencies.

Whether the feet are "tied down" or free, the power application must be such that the downstroke does not "force" the collapse of the representation for if it does a broken or bent leg will probably result. This cannot occur with the form of power application illustrated in Fig. 9.

Another satisfactory form thereof is illustrated in Fig. 10 wherein numerals of the 300 series indicate like or similar parts. The actuating arm 344 includes a slot 344a as indicated. Two actuations 339 occur per rotation of shaft.

In Fig. 11, a further modified form of rotary to reciprocatory power transformation device is illustrated. In this figure numerals of the 400 series indicate like or similar parts. In this form, shaft 439 includes an offset portion 442 that is positioned above the actuating arm 444 so that leg breakage is prevented. However, in this form only one reciprocation of member 444 occurs for each rotation of shaft 439.

In Fig. 12 numeral 526 indicates the lower limb portions of an articulated representation having ends 527 adapted to engage the concave curvilinear surface 560.

In Fig. 13 a modification of the aforesaid is illustrated and numerals of the 600 series designate like or similar parts and the curvature of said surface is of lesser radius.

In Fig. 14 numerals of the 700 series indicate like or similar parts and the curvature is of convex character.

In Fig. 15 numerals of the 800 series indicate like or similar parts and the surface represented is of bowl or saucer shape.

In Fig. 16 numerals of the 900 series indicate like or similar parts and the surface illustrated is of partial spherical character.

In Fig. 17 numerals of the 1000 series indicate like or similar parts, and the surface is inclined downwardly and forwardly toward the spectator.

In Fig. 18 numerals of the 1100 series indicate like or similar parts and the surface is inclined downwardly and rearwardly from the spectator.

In Fig. 19 there is illustrated a pyramidal form of surface with which the lower limb ends are associated and numerals of the 1200 series indicate like or similar parts.

In all of the foregoing illustrations, to-wit, Figs. 12 to 19 inclusive, the angularity may be changed to whatever is desired and also the radius of curvature may be changed to whatever is desired. In place of the concave curvilinear surface, it is quite apparent that an angular type surface with the portion 106 as merging at its lower end meeting the portion 1160—see Figs. 17 and 18 respectively—may be employed and this would be a two plane engageable surface as distinguished from the four-sided surface, pyramidal in effect of convex character illustrated in Fig. 19.

It is quite apparent also that a three-sided concave or convex surface may be utilized, the angles of inclination being but slight with reference to the longitudinal plane.

In Figs. 17 to 19, inclusive, the angles are intentionally emphasized for illustration purposes only.

While the invention has been described in great detail in the foregoing description, the aforesaid is to be considered as illustrative and not restrictive in character. Also it is to be understood that the various sources of power and means for obtaining and transforming same, are merely a conventional illustration thereof and equivalent means or mechanisms may be utilized in place thereof. Furthermore, it is to be understood that the number of animated figures utilized is not necessarily restricted to those shown, nor are the relative positions of the same to be restricted to that shown, since it is evident that a plurality of animated and movable figures may be utilized in place of the single major character, which has animated movement and which is movable transversely with reference to the stage.

Various modifications of this invention which will readily suggest themselves to persons skilled in this art, in addition to the foregoing are all considered ,therefore, to be within the scope of this invention, reference being had to the appended claims.

The invention claimed is:

1. An animated device including a vertically reciprocating power element and an articulated representation connected thereto and supported thereby including an upper member, a lower member, means pivotally connecting the members together, the upper member being connected to the power element below the center of gravity of the former and above the pivotal connection and in vertical alignment with the center of gravity, and a pair of articulated structures depending from the lower member, each structure including a plurality of longitudinally aligned and pivotally connected members, the upper ends of each structure having a pivotal connection with the lower member, said last mentioned pivotal connections being positioned symmetrically below the center of gravity of the lower member and in transverse horizontal alignment, each last mentioned pivotal connection being in alignment with the center of gravity of the uppermost of the structure members, the lower pivotal connections of the upper members to the upper ends of the next lower members being in alignment with the respective centers of gravity thereof.

2. A device as defined by claim 1, characterized by the extreme lower end of each structure being in vertical alignment with the pivotal connection and center of gravity of the lowermost member thereof and having intermittent contact with a base member for the purpose described.

3. A device as defined by claim 1, characterized by the extreme lower end of each structure being in vertical alignment with the pivotal connection and center of gravity of the lowermost member thereof and having a relatively loose connection to a base -member for the purpose described.

4. A device as defined by claim 1, characterized by the articulated representation representing an animal form and the upper member thereof representing the upper torso portion and head, said upper member having a pair of spaced eye openings therein, and by the addition of a weighted mmeber pivotally supported thereon in vertical alignment with the upper member center of gravity, and pivot alignment and above the center of gravity and having similarly spaced eye representations exposed through the eye openings.

5. A device as defined by claim 1, characterized by the articulated representation representing an animal form and the upper member thereof representing the upper torso portion and head, said upper member having a pair of spaced eye openings therein, and by the addition of a weighted member pivotally supported thereon in vertical alignment with the upper member center of gravity and pivot alignment and above the center of gravity and having similarly spaced eye representations exposed through the eye openings, and the extreme lower end of each structure being in vertical alignment with the pivotal connection and center of gravity of the lowermost member thereof and having intermittent contact with a base member for the purpose described.

6. A device as defined by claim 1, characterized by the articulated representation representing an animal form and the upper member thereof representing the upper torso portion and head, said upper member having a pair of spaced eye openings therein, and by the addition of a weighted member pivotally supported thereon in vertical alignment with the upper member center of gravity and pivot alignment and above the center of gravity and having similarly spaced eye representations exposed through the eye openings, and the extreme lower end of each structure being in vertical alignment with the pivotal connection and center of gravity of the lowermost member thereof and having relatively loose connections to a base member for the purpose described.

7. In combination, an articulated representation including a divided torso having portions pivotally connected together and an anchorage on the rear of the upper torso portion, a lever having an anchorage associated end and constituting the sole support for the representation, and rotative means actuating said lever.

8. In combination, an articulated representation including a divided torso having portions pivotally connected together, and an anchorage on the rear of the upper torso portion, a tubular member rearwardly thereof having an opposed pair of aligned slots, and a T-shaped member reciprocable in the tubular member with the transverse portions seated in said slots, one of the slot seated portions having an anchorage associated end and constituting the sole support for the representation.

CARL E. STAUDT.